US008977863B1

(12) United States Patent
Arsintescu

(10) Patent No.: US 8,977,863 B1
(45) Date of Patent: Mar. 10, 2015

(54) METHODS, SYSTEMS, AND ARTICLES OF MANUFACTURE FOR DYNAMIC PROTECTION OF INTELLECTUAL PROPERTY IN ELECTRONIC CIRCUIT DESIGNS

(75) Inventor: Bogdan Arsintescu, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 575 days.

(21) Appl. No.: 12/871,756

(22) Filed: Aug. 30, 2010

(51) Int. Cl.
*G06F 21/00* (2013.01)

(52) U.S. Cl.
USPC .......................................................... 713/189

(58) Field of Classification Search
None
See application file for complete search history.

(56) References Cited

U.S. PATENT DOCUMENTS

| | | | |
|---|---|---|---|
| 6,671,866 B2 | 12/2003 | Arsintescu | |
| 7,003,749 B2 | 2/2006 | Subasic et al. | |
| 7,735,036 B2 | 6/2010 | Dennison et al. | |
| 7,788,502 B1* | 8/2010 | Donlin et al. | 713/189 |
| 7,802,222 B2 | 9/2010 | Arsintescu | |
| 7,917,877 B2 | 3/2011 | Singh et al. | |
| 8,533,650 B2 | 9/2013 | Arsintescu et al. | |
| 8,612,922 B2 | 12/2013 | Arsintescu | |
| 8,719,764 B2 | 5/2014 | Arsintescu | |
| 2001/0034873 A1 | 10/2001 | Arsintescu | |
| 2004/0255258 A1* | 12/2004 | Li | 716/8 |
| 2004/0268284 A1* | 12/2004 | Perez et al. | 716/11 |
| 2005/0155006 A1 | 7/2005 | Subasic et al. | |
| 2008/0077901 A1 | 3/2008 | Arsintescu | |
| 2008/0282212 A1 | 11/2008 | Dennison | |
| 2009/0067632 A1* | 3/2009 | Nakano et al. | 380/277 |
| 2009/0077505 A1 | 3/2009 | Arsintescu | |
| 2009/0077513 A1 | 3/2009 | Arsintescu | |
| 2009/0282379 A1 | 11/2009 | Singh et al. | |
| 2010/0050148 A1* | 2/2010 | Stoiber | 716/18 |
| 2010/0115207 A1* | 5/2010 | Arora et al. | 711/144 |
| 2010/0325597 A1 | 12/2010 | Arsintescu | |
| 2011/0066995 A1 | 3/2011 | Arsintescu | |

OTHER PUBLICATIONS

S. Hauck et al., "Data Security for Web-based CAD", DAC 98, Jun. 15-19, 1998.
P. A. Jamkhedkar, "DRM as a Layered Systems", DRM'04, Oct. 25, 2004.
K. Bhargavan, "Verified Interoperable Implementations of Security Protocols", ACM Transactions on Programming Languages and Systems, vol. 31, No. 1, Article 5, Pub. date: Dec. 2008.

* cited by examiner

*Primary Examiner* — David Le
(74) *Attorney, Agent, or Firm* — Vista IP Law Group, LLP

(57) ABSTRACT

Various embodiments describe methods and systems for dynamic IP protection in electronic circuit designs. The methods or systems determine one or more levels of access or encryption and identify design data that should be made available for each level. For each level, a pcell instance is created to hide actual design data, and the design data that should be made available are moved to an instance of the corresponding sub-master in memory. The design data in this instance are encrypted in memory and are persisted in a side file in a non-volatile computer accessible storage medium. An authorized user is provided with a key, the side file, and a decrypting scheme to retrieve the actual design data with an appropriate level of details from the side file during a pcell evaluation process.

36 Claims, 10 Drawing Sheets

METHODS, SYSTEMS, AND ARTICLES OF MANUFACTURE FOR DYNAMIC PROTECTION OF INTELLECTUAL PROPERTY IN ELECTRONIC CIRCUIT DESIGNS

BACKGROUND

Controlling the use and distribution of intellectual property (hereinafter IP) through the electronic circuit design flow has become a greater concern for the IP providers when sharing the designs, especially in cases involving interoperable electronic circuit design databases and methodologies such as OpenAccess coordinated by the OpenAccess Coalition of the electronic design automation (hereinafter EDA) industry. In order to achieve interoperability, many electronic circuit design databases expose all the details of a design to a third party that may reuse and even modify the designs, including the intellectual property whose levels of details the provider of the IP would like to control to minimize undesired use or distribution of the IP.

The problem of protecting IP persists regardless of whether the electronic circuit design exhibits a flat or hierarchical nature. For example, when sharing a hierarchical IP block design, each sub-block in each hierarchy may carry individual value on which the IP provider of the hierarchical IP block design may wish to capitalize individually. For instance, a user that licenses to use but otherwise not to exploit, modify, or edit the details of the IP block may be entitled to access the top level but not any additional details of the IP block design.

Some conventional approaches create separate designs for the same IP block and transmit or instantiate different designs based on different access levels of different users. Some approaches also encrypt various IP designs hoping to deter undesired or unauthorized access to the IP designs for interoperability among different EDA tools. These encryption approaches do not, however, protect the IP designs from the specific EDA tools on which the encryption modules reside. For example, such encryption processes or modules may prevent other EDA tools from gaining unauthorized access to the IP designs but do not prevent the EDA tools on which the IP designs are created from accessing the IP designs.

Therefore, there exists a need for a more secure protection of IP in electronic circuit designs.

SUMMARY

Disclosed are various embodiments of methods, systems, and articles of manufactures for implementing protection of intellectual property in electronic circuit designs.

In one or more embodiments, a method or system implements protection of intellectual property dynamically during the instantiation of an IP provider's particular IP, which is sought to be protected, in a user's electronic circuit design. In these embodiments, the method or the system first initiates an IP encapsulation process for an IP block sought to be protected at one or more levels of encryption and access. The method or the system may create a first instance of a parameterized cell (pcell) for a first level of encryption or access. In one or more embodiments, a pcell instance comprises an instance of a schematic or physical representation of a component of an electronic circuit design whose sub-master is automatically generated, bound, or evaluated based at least in part upon one or more pieces of information, data, or code for the corresponding one or more governing parameters of the respective instance.

The method or the process may then move the design data for the first instance into an instance of the corresponding design sub-master in memory. In one or more embodiments, the method or the system encrypts the design data in the corresponding sub-master in a volatile computer readable or usable storage memory and then persists the encrypted design data in a side file that may be stored in a non-volatile computer readable storage medium alongside the designs. The method or the system may further identify one or more keys that correspond to the one or more levels of encryption or access.

When a user attempts to use the IP block design in the user's design, the method or the system opens the user's design and performs a pcell evaluation process in one or more embodiments. In these embodiments, the EDA design tools need to bind and re-evaluate the pcell instances as regular pcell instances. The pcell implementation process as disclosed herein provides the code to bind and re-evaluate the pcells while providing protection of IP in electronic circuit designs in some embodiments.

When the method or the system encounters the IP block design provided by the IP provider, the method or the system identifies the pcell sub-master and the corresponding side file for the IP block design in one or more embodiments. The method or the system then performs the pcell evaluation using the key that the IP provider has provided to decrypt the appropriate level of design details of the IP block design for the pcell instance from the side file.

It shall be noted that the pcell used in some embodiments is not merely used for interoperability but to hide certain predefined aspects or implementation details of the IP block from certain users while still allowing reuse of the same IP block with the same design technologies.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above may be rendered by reference to specific embodiments thereof, which are illustrated in the accompanying drawings. Understanding that these drawings depict only typical embodiments of the invention and are not therefore to be considered limiting of its scope, the invention may be described and explained with additional specificity and detail through the use of the accompanying drawings in which.

DETAILED DESCRIPTION OF THE FIGURES

Various embodiments are directed to a method, system, and computer program product for implementing dynamic protection of intellectual property in electronic circuit designs. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice various embodiments of the invention. Notably, the figures and the examples below are not meant to limit the scope of various embodiments or the claims. Where certain elements of embodiments may be partially or fully implemented using known components (or methods or processes), portions of such known components (or methods or processes) that are necessary for an understanding of various embodiments of the invention may be described, and the detailed description of other portions of such known components (or methods or processes) may be omitted for ease of explanation and not to obscure embodiments of the invention. Further, embodiments encompass present and future known equivalents to the components referred to herein by way of illustration.

Figure 1:
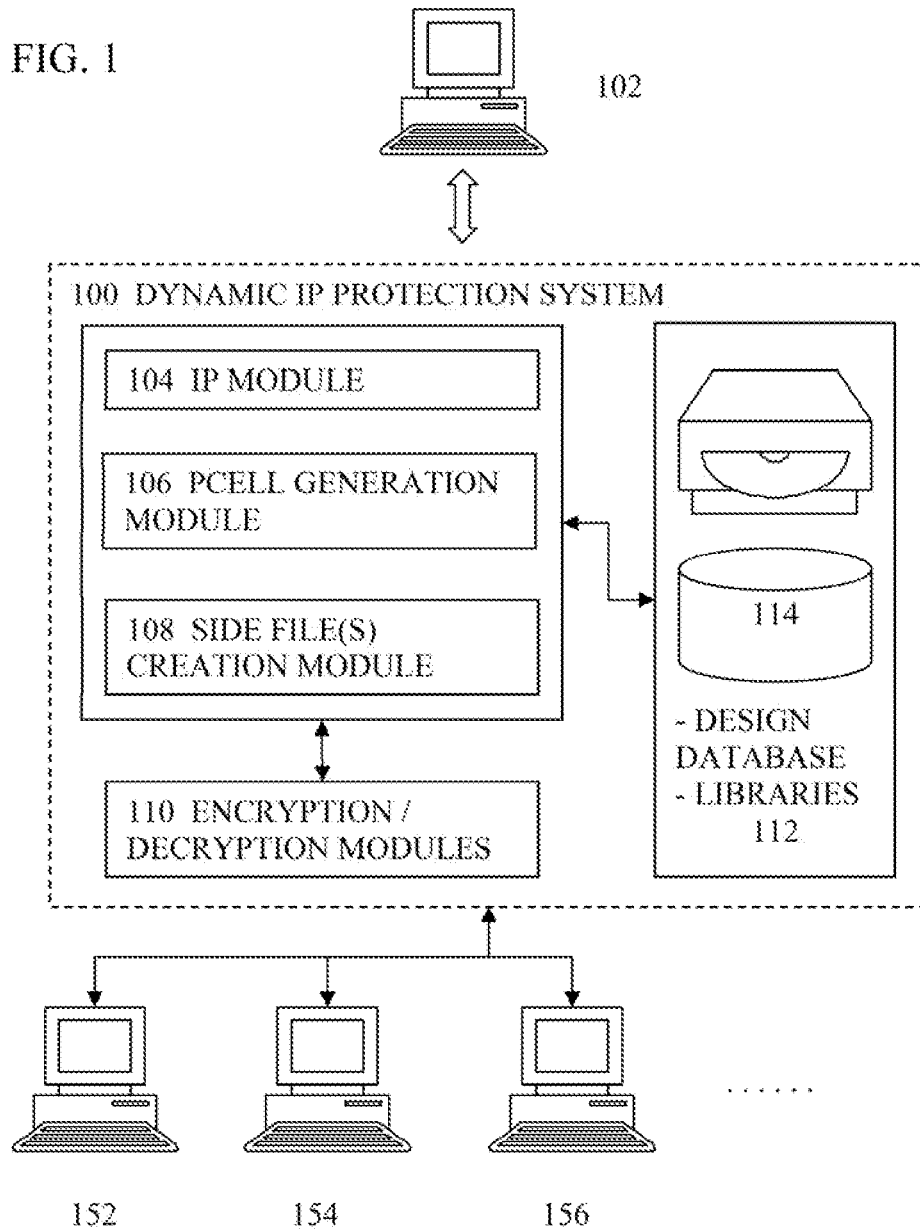
FIG. 1 illustrates an exemplary system that interacts with one or more users for implementing dynamic protection of intellectual property in electronic circuit designs.

FIG. 1 illustrates an exemplary system 102 that interacts with one or more users 152, 154, and 156 for implementing dynamic protection of intellectual property in electronic circuit designs in one or more embodiments. The exemplary system 102 comprises the dynamic IP protection system 100 which further comprises or interacts with the IP module 104, the pcell generation or creation module 106, and the side file creation module 108 in these embodiments.

The exemplary system 102 may also comprise or interacts with one or more encryption/decryption modules 110 that are invoked to perform various encryption or decryption processes on certain design data according to the level of encryption or access in some embodiments. In one or more embodiments, the exemplary system 102 may also comprise or interact with some computer readable storage medium 114 that comprises data or information such as one or more design databases or data structures 112, one or more libraries, or any other information or data required or desired to implement the electronic circuit designs.

It shall be noted that in some embodiments, the design data are encrypted in memory before the design data are persisted in the non-volatile computer readable storage medium 114. More details about the IP module 104, the pcell generation or creation module 106, the side file creation module 108, and the encryption/decryption module 110 will be described in subsequent paragraphs with reference to various figures.

Figure 2:
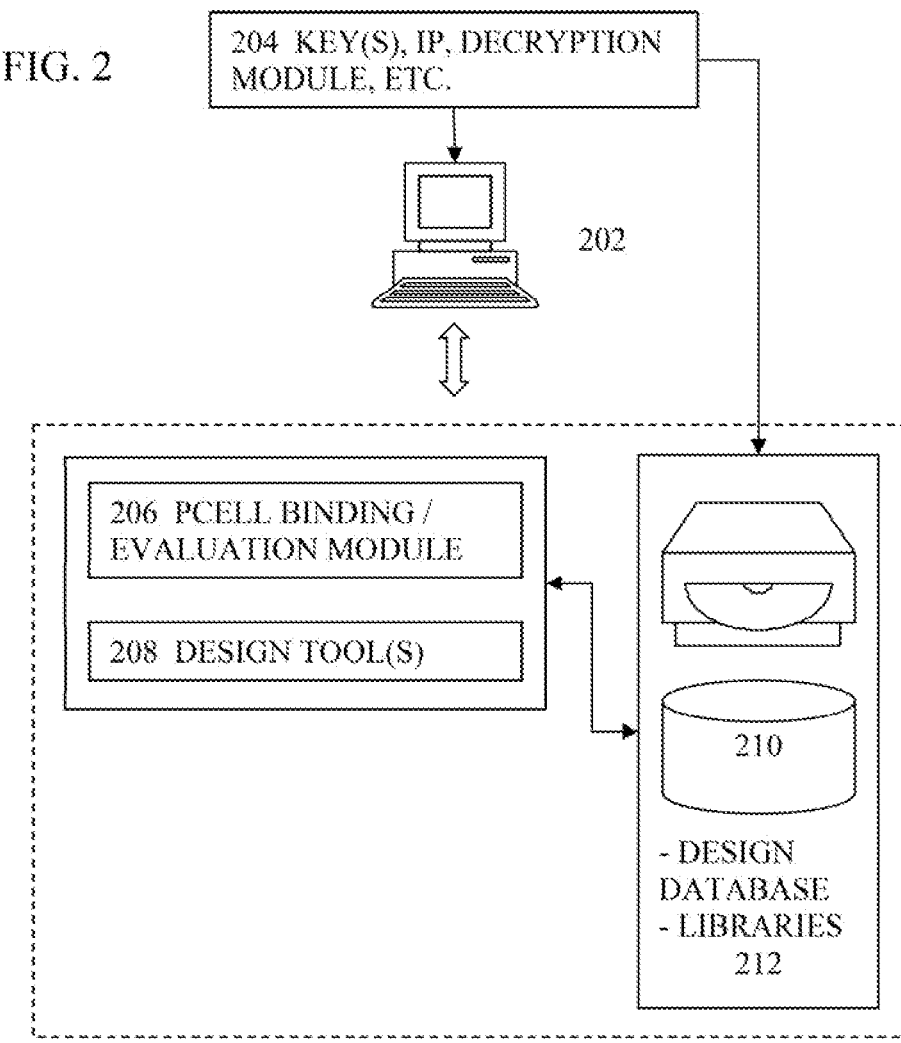
FIG. 2 illustrates an exemplary user system for implementing dynamic protection of intellectual property in electronic circuit designs.

FIG. 2 illustrates an exemplary user system 202 for implementing dynamic protection of intellectual property in electronic circuit designs in one or more embodiments. In these embodiments, the exemplary user system 202 receives various data or information 204 from one or more IP providers.

In some embodiments, the information or data 204 comprise, for example but not limited to, one or more keys from the one or more IP providers where an IP provider may provide one or more keys for a particular IP block design to the user system 202. In some embodiments, the information or data 204 may comprise the encryption or decryption module or process that may also be provided by the IP provider, where the encryption or decryption module or process may further be used together with the one or more keys to decrypt information or data that have been encrypted by the IP provider. The information or data 204 may also comprise the sub-master of the IP block design and the corresponding side file that comprises encrypted design data for the IP block design for various levels of encryption or access.

The exemplary user system 202 may comprise or interact with a pcell binding or evaluation module 206 that is used or invoked to bind and evaluate various pcells in the user's design. The exemplary user system 202 may further comprise one or more EDA tools 208 to implement the electronic circuit design on the exemplary user system 202. The one or more EDA tools 208 comprise any electronic circuit design tools such as a layout editor tool, a placement tool, a router tool, a post-layout optimization tool, one or more verification tools, etc. The exemplary user system 202 may further comprise or interact with one or more volatile or non-volatile computer accessible storage media 210 to persist or read various information or data such as databases or libraries 212 that are needed for the electronic circuit design.

More details about the pcell binding or evaluation module 206 will be described in subsequent paragraphs with reference to various figures.

Figure 3:
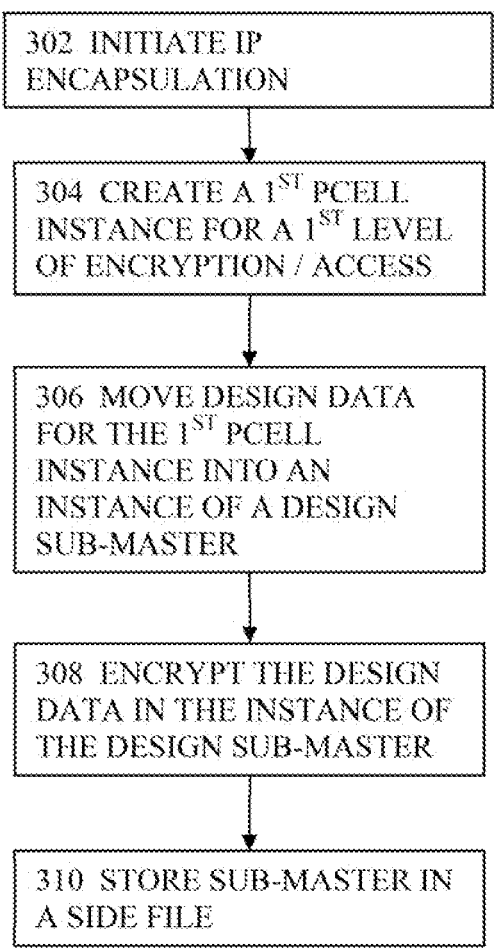
FIG. 3 illustrates a top level flow diagram of a method or system for implementing dynamic protection of intellectual property in electronic circuit designs.

FIG. 3 illustrates a top level flow diagram of a method or system for implementing dynamic protection of intellectual property in electronic circuit designs in one or more embodiments. In these embodiments, the method or the system for implementing dynamic protection of intellectual property in electronic circuit designs comprises the process or module 302 for initiating the IP encapsulation. The method or the system may further comprise the process or module for creating a first pcell instance for a first level of encryption or access at 304 in one or more embodiments.

It shall be noted that the pcell used in these embodiments is not merely used for interoperability among various EDA tools but to hide certain predefined aspects or implementation details of the IP block from certain users (for example, but not limited to, unauthorized user(s)) while still allowing reuse of the same IP block with the same design technologies. In some embodiments, the first pcell instance may be created at 304 only in a volatile computer accessible storage medium but not in a non-volatile computer readable storage medium. After the method or the system performs the process or module 304 for a plurality of encryption or access levels in some embodiments, the IP block design comprises the block boundary data (for example, but not limited to, one or more terminals, one or more pins, one or more nets, etc.) and a set of one or more pcell instances that exist only in a volatile memory. It shall be noted that the one or more nets or connectivity data may not be needed, and thus the information or data may not necessarily comprise the net(s) or the connectivity data in some embodiments.

The method or the system may then identify and move certain design data for the first pcell instance into an instance of a design sub-master at 306 in one or more embodiments. In some embodiments, the method or the system determines whether certain piece of data or information should be moved into the instance of the design sub-master based at least in part upon a particular level of encryption or access. It shall be noted that in these embodiments, the hierarchical structure of the IP block design has been altered by the creation of the pcell instance or by moving the design data for the pcell instance to an instance of a sub-master for a particular level of encryption or access.

At 308, the method or the system performs the process or invokes the hardware module for encrypting the design data that have been moved into the instance of the design sub-master for the first level of encryption or access in one or more embodiments. In some embodiments, the encryption occurs in a volatile computer readable storage medium, such as a volatile memory. In some embodiments, the process or module for encrypting the design data may encrypt all or only a part of the entire design data of the IP block design. Whether the process or module for encryption the design data encrypts all or only a part lesser than the whole of the entire design data may be determined based at least in part upon which data or information needs to be protected in some embodiments.

In some embodiments, the encryption module uses the same cipher to transform the plaintext into the ciphertext or encrypted information or data and also to reverse the process to transform the ciphertext into the original plaintext. That is, the encryption module uses the same algorithm or cipher for encryption as well as for decryption in these embodiments. In some embodiments, the method or the system may comprise any off-the-shelf cipher for the encryption module. In some embodiments, the encryption module may comprise one or more custom encryption algorithms. In some embodiments where more than one cipher may be used, the encryption module may comprise one or more off-the-shelf ciphers, one or more custom encryption algorithms, or a combination of one or more off-the-shelf ciphers and one or more custom encryption algorithms.

For example, the encryption module may comprise a process or sub-module that strips any comments unnecessary for optimization in some embodiments. The encryption module may comprise a process or sub-module that flattens the netlist for a hierarchical electronic circuit design by replacing calls to common sub-circuits by the logic that groups together the common sub-circuits without changing the circuit functionality in some embodiments. The encryption module may comprise a process or sub-module that removes some or all circuit functionality information or data or the exact functions computed in the IP block design in some embodiments. This process or sub-module may be particularly useful when the targeted use of the IP block design is for placement or routing optimization where the placement tool and the router view the circuit design as a graph and generally do not care about the exact functions computed in the IP block design, and therefore the removal of the functionality or functions computed still allows these electronic circuit design tools to perform optimizations without negatively affecting their intended purposes or functions.

The encryption module may comprise a process or sub-module that alters one or more net directions or one or more signal flow directions in some embodiments. In some cases, the directions of the signal flows may give hint to circuit behavior even after the functionality of the circuit has been removed. In these cases, the IP block design may be further protected by altering the directions of the signals or the nets.

The encryption module may comprise a process or sub-module that removes one or more nets in some embodiments. For example, the process or sub-module may be programmed or configured to remove information or data of high-fanout nets or signals in some embodiments, especially for EDA tools that do not require such nets or signals. The encryption module may comprise a process or sub-module that partitions the IP block design into a plurality of smaller pieces in some embodiments. The encryption module may comprise a process or sub-module that simplifies one or more components of the IP block design (for example but not limited to high-fanin and high-fanout signals, both of which are known for providing convenient points of reference for reverse engineering) in some embodiments.

At 310, the method or the system stores or persists the encrypted design data of the instance of the design sub-master in a side file in a non-volatile computer accessible storage medium in one or more embodiments. In these embodiments, the side file comprises a block of information or one or more resources for storing the information that may be available to a computer system or a computer program and is usually based on some type of persistent and durable storage form. In some embodiments, the encrypted design data of the IP block design may be deflated into a sequence of bits to be stored in the side file. In one embodiment where an OpenAccess design database is used, a side file comprises a generic OA IPCell file that may be stored alongside the design itself. In some embodiments, the side file may be stored in the same directory in which the corresponding design may also be stored. In some embodiments, the appropriate level of design data for a sub-master of the pcell instance may be encrypted in volatile computer readable storage medium before they are stored in the same side file. In these embodiments, the actual design data are stored in the encrypted side file and require the pcell evaluation process, which binds and re-evaluates all pcell instances in the design, to be reconstructed.

In some embodiments, the method or system for implementing dynamic protection of IP in electronic circuit design may further configure the pcell to provide the information or data that indicate the starting bit location and the ending bit location or the starting (or ending) bit location and the length information for a particular encryption or access level in the side file. In these embodiments, the information or data provided render a process or sub-module, such as an inflating process or sub-module, to know which part of the side file is to be identified or retrieved for decryption in order to reconstruct or reconstitute the IP block design for a particular user having the particular encryption or access level.

In these embodiments, the method or the system may deflate each of a plurality of encrypted design data for a plurality of pcell instances that correspond to a plurality of encryption or access levels and stores all the deflated, encrypted design data for the plurality of encryption or access levels in a single side file on a non-volatile computer accessible storage medium. In some embodiments, the actual design data for instantiating pcell instances for a plurality of encryption or access levels may be encrypted and then stored in multiple side files. In one or more embodiments, the method or the system may further store the encryption or access level and other necessary information (such as, but not limited to, the starting bit location and ending bit location or the starting or ending bit location and length of the IP block design for the encryption or access level) in one or more parameters of the pcell instance such that the pcell evaluation process or module may restore the level of details for the IP block design according to the encryption or access level. In this manner, the IP provider of the IP block design may control the levels of details of the IP design block according to the levels of encryption or access of particular users. The one or more parameters need not be human-readable in some embodiments; rather, the one or more parameters only need to be understood by the pcell evaluation process that is described in subsequent paragraph(s) with reference to one or more figures.

In some embodiments, the method or the system may further distribute a key that corresponds to a particular encryption or access level so a user with the particular encryption or access level may decrypt the appropriate level of design data with the key. The key may be presented in any appropriate form so long as it enables the user to properly decrypt the permitted level of details of design data. For example, the key may include textual, binary, or other forms of string of data, textual, binary, or other forms of files, an electronic device that communicates with and transmits necessary information or data to the method or the system to decrypt the encrypted design data in the side file and to reconstruct the IP block design with the permitted level of details, or any other forms that serve substantially the same functions or purposes.

Figure 4:
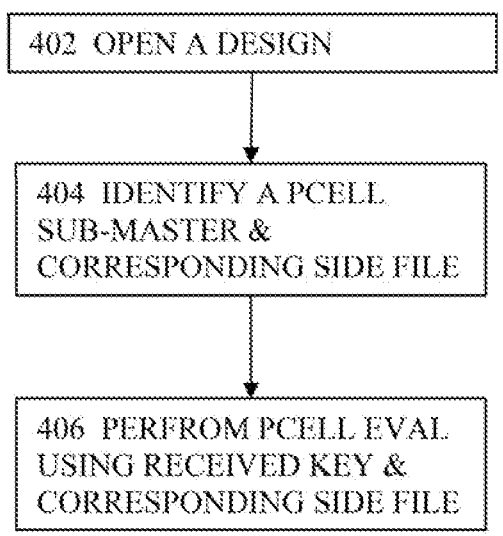
FIG. 4 illustrates a top level flow diagram of a method or system for implementing dynamic protection of intellectual property in electronic circuit designs.

FIG. 4 illustrates a top level flow diagram of a method or system for implementing dynamic protection of intellectual property in electronic circuit designs. At 402, the method or the system comprises the process or sub-module for opening an electronic circuit design that comprises an IP block design in one or more embodiments. In some embodiments, the IP block design constitutes the intellectual property sought to be protected, and therefore the actual design data of the IP block design are stored in a side file that may be stored alongside the design itself. Without the property key to unlock and decrypt the side file, only the boundary data (for example, but not limited to, information or data of one or more terminals, one or more pins, or one or more nets, etc.) of the IP block design may be shown in the design opened at 402. The method or the system may also comprise the process or module for identifying a pcell sub-master and the corresponding side file in which the design data of the pcell sub-master are stored at 404 in one or more embodiments.

In one or more embodiments, the method or system may further comprise the process or module for performing pcell evaluation at 406. In these embodiments, the pcell evaluation process binds and re-evaluates various pcell instances in the electronic circuit design. In particular, the process or module 406 performs pcell evaluation by using the key provided by the IP provider to unlock the side file for the IP block design. The pcell instance comprises one or more parameters for the encryption or access level and other data or information necessary to decrypt the appropriate level of details for the design data in some embodiments. In some embodiments where the design data of the IP block design for a plurality of encryption or access levels are deflated into a side file, information or data for evaluating the one or more parameters may further comprise, for example but not limited to, the starting bit location and the ending bit location, the starting or ending bit location and the length of the appropriate level of details for the corresponding level of encryption or access.

In these embodiments; the method or the system uses the information or data of the key or the key itself to unlock or decrypt the side file so as to obtain the appropriate level of details of the design data for reconstructing and instantiating the pcell instance for the IP block design in the electronic circuit design. The key determines which level of details of the design data is to be decrypted from the side file for the instantiation and reconstruction of the IP block design in the electronic circuit design.

For example, in some embodiments where a user may be permitted only to use the IP block design but may otherwise be prohibited from exploiting, modifying, or editing the IP block design, an appropriate key may be provided by the IP provider together with the decryption scheme to the user such that the IP block design, when instantiated in the electronic circuit design, only contains the boundary information or data. Further details of the IP block design are thus hidden from the user. The user may still fully use the IP block with the same design technologies and tools but may otherwise be prevented from exploiting the IP block design.

In some embodiments where the foundry is to fabricate the electronic circuit according to the electronic circuit design that comprises the IP block design, the foundry may be provided with another key which permits the foundry to have read access to all the details (for example, detailed geometric information) of the entire IP block design such that the foundry knows how to manufacture the entire electronic circuit. In some embodiments where another user is, for example, licensed to fully exploit, alter, or edit the IP block design, this user may be provided with another key that permits the user to not only read all the detailed data but also alter the IP block design. Other levels of encryption or access may also exist, and the corresponding keys may be generated and transmitted to the respective users for such levels of encryption or access.

Figure 5:
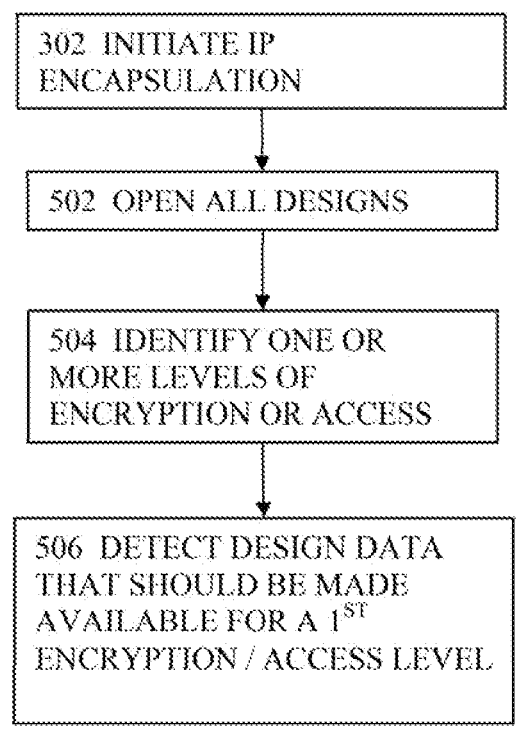
FIG. 5 illustrates more details of the initiating IP encapsulation process or hardware module.

FIG. 5 illustrates more details of the initiating IP encapsulation process or hardware module 302. In one or more embodiments, the process or module for initiating IP encapsulation comprises the process or sub-module for opening all designs of the IP block design sought to be protected at 502. At 504, the process or module for initiating IP encapsulation may further comprise the process or sub-module for identifying one or more levels of encryption or access in some embodiments. For example, the process or module may identify a first level of encryption or access that permits only the boundary information or data that show, for example, one or more terminals or pins or connectivity data or information for the IP block design. As another example, the process or module may identify a second level of encryption or access that permits the user to have read access, write access, or both to all the detailed information or data of the IP block design.

At 506, the process or module for initiating IP encapsulation may further comprise the process or sub-module for detecting design data that should be made available for the first level of encryption or access in some embodiments. In the example where a user may be permitted only to access the boundary information or data of the IP block design, the process or module at 506 then detects such boundary information or data for this particular level of encryption or access. In the example where the user may be permitted to access all details of the IP block design, the process or module at 506 then detects all details of the design data for the IP block design. The process or module 506 may also detect any intermediate levels of details of the design data for the IP block design based at least in part upon the level(s) of access or encryption.

Figure 6:
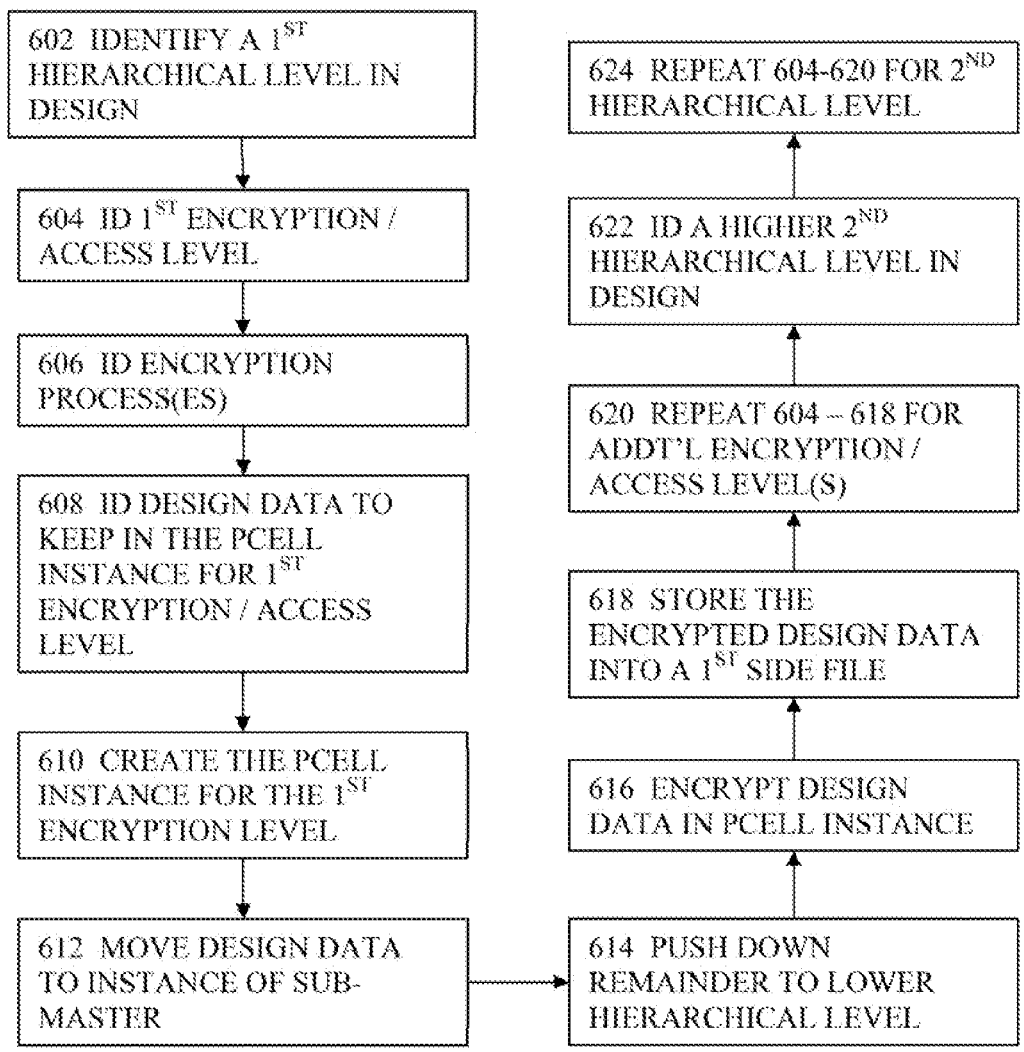
FIG. 6 illustrates a more detailed flow diagram of a method or system for implementing dynamic protection of intellectual property in electronic circuit designs.

FIG. 6 illustrates a more detailed flow diagram of a method or system for implementing dynamic protection of intellectual property of an IP block design in electronic circuit designs in one or more embodiments. In these embodiments, the IP block design comprises a hierarchical design with one or more hierarchical levels. In some embodiments where the IP block design comprises only one hierarchical level, the IP block design may also be considered as a flat design.

In one or more embodiments, the method or the system for implementing dynamic protection of intellectual property of an IP block design in electronic circuit designs comprises a process or module 602 for identifying a first hierarchical level in the IP block design. The method or the system may further comprise the process or module 604 for identifying an encryption or access level from one or more encryption or access levels. In some embodiments, the one or more encryption or access levels are associated with corresponding levels of rights to access the IP block design. For example, the one or more encryption or access levels may be associated with corresponding levels of rights according to, for example, respective licenses for different users.

The method or the system may further comprise the process or module 606 for identifying one or more encryption processes, modules, schemes, or ciphers (hereinafter encryption process) that may be used for transforming various data or information, which may also be referred to as plaintext, such that the transformed or encrypted data or information, which may also be referred to as ciphertext, is unreadable by any persons or machines except those that possess the knowledge, information, or data. In some embodiments, such knowledge, information, or data comprise the key. In some embodiments, such knowledge, information, or data may also comprise any information or data that are needed to unlock, decrypt, or reconstruct the IP block design.

The method or the system may further comprise the process or module 608 for identifying design data of the IP block design that should be kept in a pcell instance for the first encryption or access level when a user at the first encryption or access level attempts to instantiate the pcell instance in an electronic circuit design in one or more embodiments. For example, the method or the system may identify the boundary information (for example, the IP block boundary data, one or more terminals, one or more pins, or one or more nets, etc.) for an encryption or access level that permits only use of the IP block design but prohibits any further exploitation, modifications, or edits of the details of the IP block design at any hierarchical levels in some embodiments. In some other embodiments, the method or the system may identify complete detailed design data (for example, detailed geometric data, etc.) of the entire IP block design for another encryption or access level that permits complete exploitation, modifications, or edits of the entire IP block design.

The method or the system may further comprise the process or module 610 for creating a first pcell instance for the first encryption or access level in one or more embodiments. In these embodiments, the first pcell instance may be created in a volatile computer accessible storage medium rather than on a non-volatile computer accessible storage medium. It shall be noted that the pcell instance used in these embodiments is not merely used for interoperability among various EDA tools but to hide certain predefined aspects or implementation details of the IP block from certain users while still allowing reuse of the same IP block with the same design technologies.

For example, the pcell instance may comprise information or data that are required to unlock, decrypt, or reconstruct the IP block design when the pcell instance is evaluated and bound in the electronic circuit design comprising the IP block design. In some embodiments, unlike a regular pcell instance, the pcell instance may not be used to, for example, draw geometries or reconstruct a certain component of a design; rather, the pcell instance may be used to hide certain level of details of design data by the IP provider and to unhide the encrypted or otherwise protected certain level of details of the design data during the pcell evaluation process by a user with certain level of encryption or access level. In some embodiments, the deletion or removal of the pcell instance may not be able to compromise the protection of the actual design data because the removal or deletion of the pcell actually interrupts the pcell evaluation so the actual design data in the side file may never be decrypted and retrieved, and thus the IP block design may no longer be reconstructed.

At 612, the method or the system for implementing dynamic protection of intellectual property of an IP block design in electronic circuit designs comprises a process or module for moving design data to an instance of a sub-master for the first pcell instance in one or more embodiments. In some embodiments, the instance of the sub-master for the first pcell instance exists in a volatile computer accessible storage medium rather than on a non-volatile computer accessible storage medium.

At 614, method or the system may further optionally comprise a process or module for pushing down the remainder of the entire design data other than the design data identified or detected at 608 of the IP block design sought to be protected to a lower hierarchical level in one or more embodiments. In some embodiments, the process of pushing down the remainder of the entire design data occurs completely in a volatile or transitory computer accessible storage medium rather than in a non-volatile computer accessible storage medium. In the embodiments where one or more of the processes or modules 610, 612, or 614 are performed or invoked, the hierarchical structure of the electronic circuit design comprising the IP block design may be altered due to the creation of the first pcell instance, the moving of the design data identified at 608, or by the pushing down of the remainder of the entire design data at 614 to a lower level of hierarchy. In some embodiments where the electronic circuit design comprises a flat structure or a single hierarchical level, the creation of the first pcell instance, the moving of the design data identified at 608, or the pushing down of the remainder of the entire design data at 614 creates an additional level of hierarchy in the originally flat structure.

The method or the system for implementing dynamic protection of intellectual property of an IP block design in electronic circuit designs comprises a process or module 616 for encrypting the design data that are identified at 608 and moved to the instance of the sub-master at 612 in one or more embodiments. In some embodiments, the encryption process occurs completely within a volatile computer accessible storage medium rather than in a non-volatile computer accessible storage medium. In some embodiments, the process or module 616 may comprise any off-the-shelf cipher for the encryption module. In some embodiments, the process or module 616 may comprise one or more custom encryption algorithms. In some embodiments where more than one cipher may be used, the process or module 616 may comprise one or more off-the-shelf ciphers, one or more custom encryption algorithms, or a combination of one or more off-the-shelf ciphers and one or more custom encryption algorithms.

At 618, the method or the system for implementing dynamic protection of intellectual property of an IP block design in electronic circuit designs comprises a process or module 618 for storing or persisting the design data in a side file alongside the design in a non-volatile computer accessible storage medium for reuse in one or more embodiments. The side file is thus interoperable among various EDA tools, some of which may even be incompatible with each other, and provides dynamic protection for the IP in the IP block design. In some embodiments, the side file may be created ahead of time so as to be used for storing the encrypted actual design data for the pcell instances at various encryption or access levels in a non-volatile computer accessible storage medium. The method or the system provides dynamic protection for the IP in the IP block design because the persisted side file comprises the actual design data that are encrypted, and the actual design data only exist in volatile computer accessible storage medium and are encrypted before the design data are stored in a non-volatile computer accessible storage medium and after the design data are properly decrypted during the pcell evaluation process.

At 620, the method or the system comprises a process or module for repeating the processes or modules of 604-618 for additional levels of encryption or access in one or more embodiments. In some embodiments, one pcell instance may be created for each of a plurality of levels of encryption or access; the corresponding design data are identified for each pcell instance, moved to a respective sub-master, encrypted, and stored in a single side file. In these embodiments, the single side file comprises the actual design data for the IP block design, whereas each pcell instance may be used to unlock the side file, decrypt the appropriate level of details of actual design data according to the level of encryption or access a user has, and reconstruct the IP block by using the decrypted design data. The pcell instance comprises one or more parameter values according to the key which corresponds to an appropriate level of encryption or access and may be used to invoke the decryption process to decrypt the actual design data with the appropriate level of details for reconstructing the IP design block during pcell evaluation or implementation. In some embodiments, the actual design data for a plurality of encryption or access levels are stored in more than one side files.

At 622, the method or the system comprises a process or module for identifying a second hierarchical level in the IP block design in one or more embodiments. In some embodiments, the second hierarchical level identified at 622 is at a higher hierarchy than the first hierarchical level identified at 602. In some embodiments, the second hierarchical level comprises information or data of the IP block design at a finer granularity. In some other embodiments, the second hierarchical level comprises information or data of the IP block design at a coarser granularity. At 624, the method or the system comprises a process or module for repeating the processes or modules 604 through 620 for the second hierarchical level in one or more embodiments. In some embodiments, the method or the system repeats the processes or modules through all the hierarchical levels in the IP block design such that each level of hierarchy is protected individually at individual levels of encryption or access.

Figure 7:
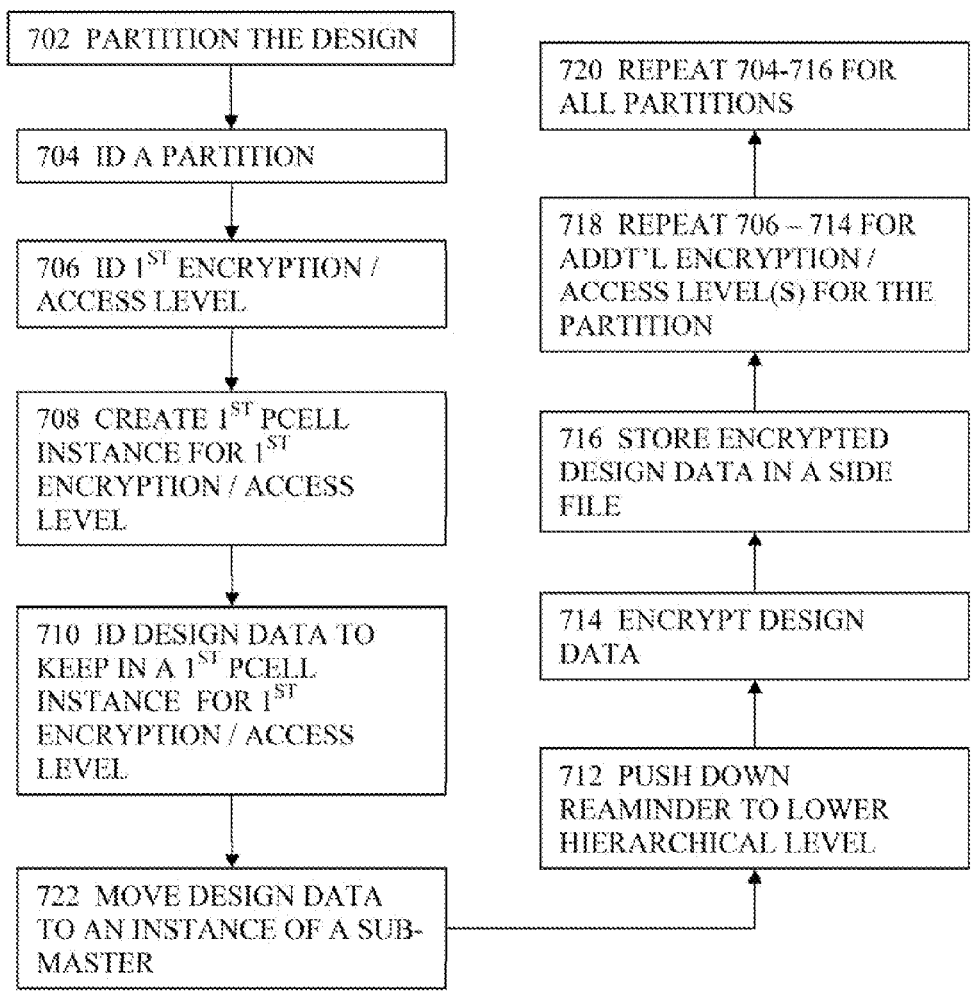
FIG. 7 illustrates a more detailed flow diagram of a method or system for implementing dynamic protection of intellectual property in electronic circuit designs.

FIG. 7 illustrates a more detailed flow diagram of a method or system for implementing dynamic protection of intellectual property in electronic circuit designs. In one or more embodiments, the method or system for implementing dynamic protection of intellectual property in electronic circuit designs comprises a process or module 702 for partitioning an electronic circuit design into one or more partitions. In one or more embodiments, the electronic circuit design may be partitioned arbitrarily. In addition or in the alternative, the electronic circuit design may be partitioned intelligently. For example, the electronic design may be partitioned along a certain routing direction or other direction(s) in some embodiments. In one or more embodiments, the electronic circuit design may be partitioned according to a user's specification. In some embodiments, the electronic circuit design may be partitioned based on the number of levels of encryption or access. For example, the number of different levels of protection and thus different levels of encryption or access may be first determined for the electronic circuit design, and then the electronic circuit design may be partitioned according to the different levels of protection or encryption. In some embodiments, the electronic circuit design may be partitioned by using a combination of any of the above processes.

At 704, the method or the system may further comprise the process or module for identifying a partition from the one or more partitions created at 702 in one or more embodiments. At 706, the method or the system may further comprise the process or module for identifying a first level of encryption or access from one or more levels of encryption or access in one or more embodiments. At 708, the method or the system may further comprise the process or module for creating a first pcell instance for the first level of encryption or access in one or more embodiments.

The method or system may further comprise the process or module 710 for identifying or detecting design data that should be kept in a first pcell instance in one or more embodiments. The method or system may further comprise the process or module 722 for moving the design data identified or detected for the first instance corresponding to the first level of encryption or access at 710 to an instance of sub-master for the first instance in one or more embodiments.

The method or the system may also optionally comprise the process or module 712 for pushing down the remainder to a lower hierarchical level in one or more embodiments. In some embodiments where the IP block design comprises a flat, non-hierarchical design, the method or the system creates a hierarchical structure with one or more additional hierarchical levels for the IP block design due to one or more processes or modules of 708 and 712. In some embodiments where the IP block design comprises a hierarchical design, the method or the system alters the hierarchical structure with one or more additional hierarchical levels due to one or more processes or modules of 708 and 712.

At 714, the method or the system comprises the process or module for encrypting the design data identified for the first pcell instance that may be associated with the first level of encryption or access in one or more embodiments. In some embodiments, the process or module 714 performs the encryption process on the identified or detected design data completely within a volatile computer accessible storage medium rather than in a non-volatile computer accessible storage medium. At 716, the method or system may further comprise the process or module for storing or persisting the encrypted design data in a side file alongside the design itself in a non-volatile computer accessible storage medium in one or more embodiments.

At 718, the method or system may further comprise the process or module for repeating the processes or modules 706 through 714 for one or more additional levels of encryption or access for the partition identified at 704. At 720, the method or system may further comprise the process or module for repeating the processes or modules 704 through 706 for all of the partitions that are created at 702 in or more embodiments.

Figure 8:
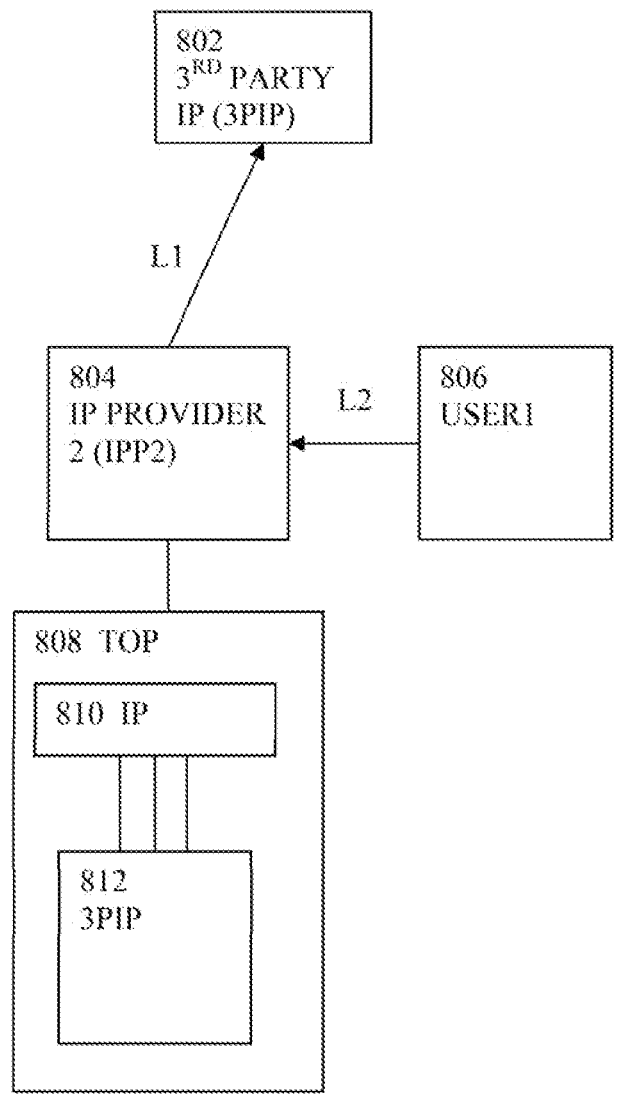
FIG. 8 illustrates an example for the implementation of dynamic protection of intellectual property in electronic circuit designs in some embodiments.

FIG. 8 illustrates an example for the implementation of dynamic protection of intellectual property in electronic circuit designs in some embodiments. In the example illustrated in FIG. 8, a third party IP provider provides a third party IP (3PIP) 802 according to various methods or systems as described in the preceding paragraphs with reference to FIGS. 1-7. Another IP provider, the second IP provider (IPP2) 804 provides another IP which comprises the TOP design at the top abstraction level 808 which further comprises the IP of the second IP provider 810 and the third party IP 812 according to various methods or systems as described in the preceding paragraphs with reference to FIGS. 1-7.

The third party IP provider may create the third party IP with a third party side file for storing the actual design data of the third party IP according to various methods or systems as described in the preceding paragraphs. The third party IP provider may further create, for example, two levels of encryption or access for the third party IP, where the first level of encryption or access permits access to only the boundary information for the third party IP, and the second level of encryption or access grants access to a first level of details for the design data of the third party IP. In this example, the second IP provider is assumed to have only the first level of encryption or access to the third party IP in the Top design 808. That is, the second IP provider only has access to the boundary information of the third party IP.

The second IP provider may also create the IP with a second side file for storing the actual design data of the IP of the second IP provider and the third party IP according to various methods or systems as described in the preceding paragraphs. The second IP provider may further create two levels of encryption or access, where the first level of encryption or access gives access to only the boundary information for both the IP 810 of the second IP provider and the third party IP 812 incorporated in the Top design 808. The second level of encryption or access gives access to the first level of details of the actual design data of the IP 810 of the second IP provider and only the boundary information for the third party IP because the second IP provider only has right to access the third party IP according to the first encryption or access level.

The user 806 attempts to incorporate the design 808 and is assumed to have the second level of encryption or access. The user 806 may be provided with a key that unlocks the side file also provided by the second IP provider. The user 806 may also be provided with the decryption algorithm to decrypt the actual design data of the Top design 808 by using at least the key during a pcell evaluation or binding process. In some embodiments, the user may further be provided with the third party side file, the second key, and the second decryption algorithm that the second IP provider obtains from the third party. This second key may be used together with the second decryption algorithm to unlock or decrypt only the boundary information from the third party IP side file because the second IP provider is only permitted to access the boundary information of the third party IP 812 from the third party side file.

In this example, the user 806 may use the key to unlock the side file of the Top design 808 and use the decryption algorithm to decrypt the actual design data with the first level of details as the key permits from the side file created by the second IP provider 804. When the user attempts to instantiate a pcell instance for the third party IP that has been incorporated in the second IP provider's Top design 808, the pcell evaluation process refers to or uses the second key to unlock the third party side file (which is stored alongside the design itself) and uses the second decryption algorithm to decrypt the appropriate level of details (boundary information only) for the actual data of the third party IP 812. When the pcell evaluation process completes the binding and evaluation of the pcell instances for both the IP 810 of the second IP provider and the third party IP 812, the design comprises the first level of details for the IP 810 of the second IP provider and only boundary information (for example, terminal(s), pin(s), or net(s), etc.) for the third party IP 812.

Moreover, in this example, every design corresponds to a side file—the third party IP corresponds to the third party side file delineating various levels of encryption or access, and the second IP provider's Top design 808 corresponds to another side file. In some embodiments, the side file corresponding to the Top design 808 of the second IP provider comprises a reference to the third party side file that comprises the actual data of the third party IP. At the time the pcell evaluation process is initiating the instance of the third party IP, such a reference to the third party side file enables the pcell evaluation process to use the second key to locate and unlock the third party side file and to decrypt the appropriate level of details of the actual design data during the evaluation of the pcell instance that hides the actual design data of the third party IP 812 in the Top design 808.

In addition or in the alternative, in some embodiments where OpenAccess databases and technologies are utilized, the side file for the second IP provider 804 may be stored alongside with the Top design 808 in a first directory, and the side file for the third party IP 802 may be stored alongside with the design of the third party IP itself in a separate directory in which third-party IPs and their corresponding side files are stored. Furthermore, based at least in part on the level of encryption or access of a user, the third party IP and its corresponding side file may be stored in a "hard directory" in some embodiments. That is, when an instance of the third party IP is instantiated in a user's design, the method or the system in some embodiments retrieves the necessary data and information from the side file in the "hard directory" during the pcell evaluation process.

Figure 9:
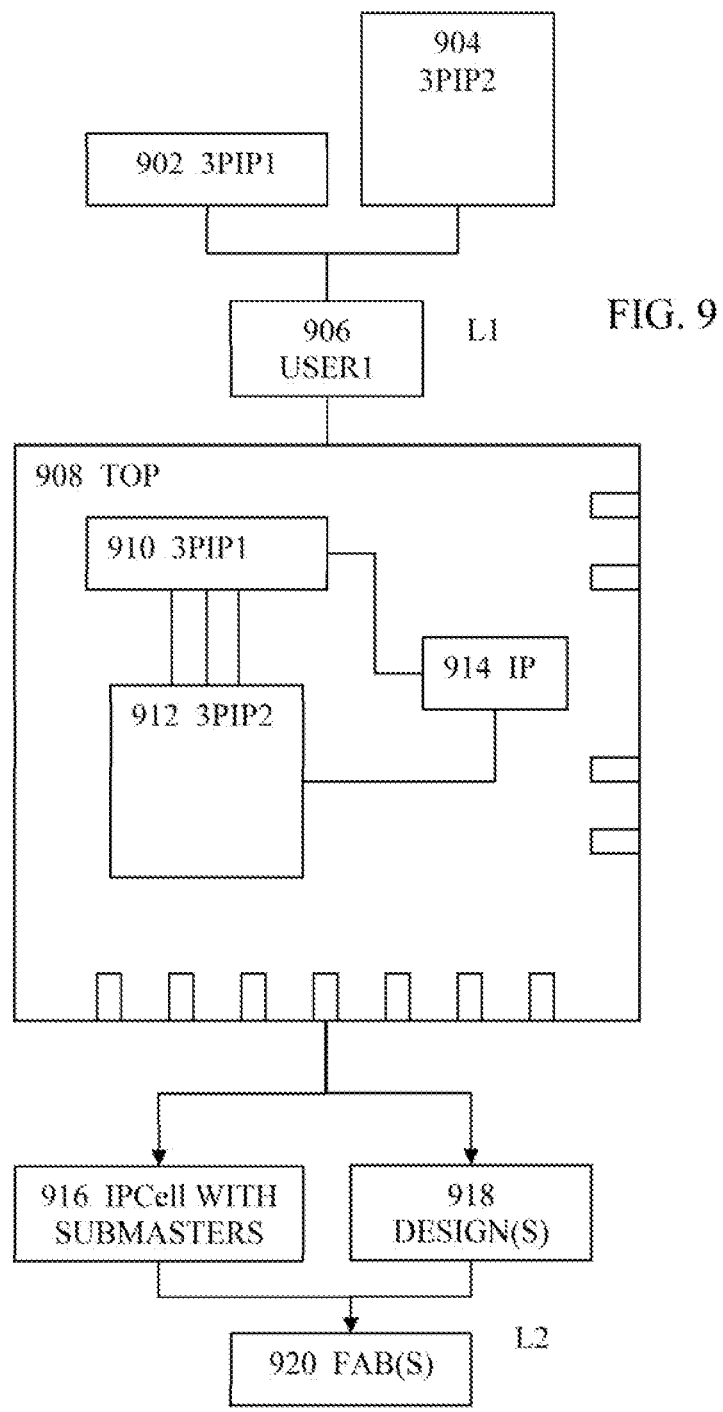
FIG. 9 illustrates an example for the implementation of dynamic protection of intellectual property in electronic circuit designs in some embodiments.

FIG. 9 illustrates an example for the implementation of dynamic protection of intellectual property in electronic circuit designs in some embodiments. In this example, a third party IP provider provides the first third party IP (3PIP1) 902 and the second third party IP (3PIP2) 904 to the user. The third party IP provider further sets forth at least two levels of encryption or access, where the first level of encryption or access allows authorized users to access only the boundary information of the third party IP, and the second level of encryption or access allowed authorized users to access to a first level of details for the design data of the IP created by the third party IP provider.

In this example, the user 906 has the first level of encryption or access to both the 3PIP1 902 and 3PIP2 904. In other words, the user 906 only has access to the boundary information or data of the 3PIP1 902 and 3PIP2 904 but may otherwise be prohibited from exploiting, modifying, editing, or accessing further details of 3PIP1 902 and 3PIP2 904. The user 906 creates a design (TOP) 908 that incorporates the 3PIP1 910 and the 3PIP2 912. The user 906 further creates its own IP 914 in the TOP design 908 according to some embodiments as described in the preceding paragraphs.

By using the methods or systems as described in some of the preceding paragraphs above, the user first sets forth, for example, at least two levels of access or encryption for the TOP design 908, where the first level of encryption or access allows authorized users to access only the boundary information for all components, blocks, etc. in the TOP design 908, and the second level of encryption or access allows authorized users to access the actual design data at the first level of details for the user's own IP 914 and only boundary information for the IP provided by the third party such as 3PIP1 910 and 3PIP2 912. In other words, the user has already detected, identified, or determined the actual data that should be made available for each level of encryption or access. The user may also set up the corresponding key for each level of encryption or access. The appropriate keys may be provided to respective authorized users to unlock the side file and to decrypt the actual design data at an appropriate level of details from the side file.

For each level of encryption or access, the user 906 may then create a pcell instance for the TOP design 908 to hide the actual design data of the TOP design 908 and move the actual design data that should be made available for each level of encryption or access to an instance of a corresponding submaster in some embodiments. At this point, the pcell instance and the sub-master exist only in a volatile computer accessible storage medium rather than in a non-volatile computer accessible storage medium to further enhance protection of the IP. The user 906 then invokes an encryption process to encrypt the actual design data for the sub-master and then stores the encrypted actual design data in a side file in a non-volatile computer accessible storage medium. The user may repeat the processes for some or all the encryption or access levels for the TOP design 908 and stores the encrypted actual design data in a single side file alongside the design 908. In some embodiments, the side file comprises an OpenAccess IPCell file 916 that comprises all the sub-masters for all the encryption or access levels.

When the TOP design 908 is to be manufactured by a foundry 920, the foundry 920 needs to have at least read access to the full details of the TOP design. The user 906 may transmit the designs 918 together with the appropriate key to unlock the side file 916 at the second level of encryption or access, and the appropriate decryption algorithm(s) to the foundry 920 such that the foundry 920 may read all the detailed data or information of the TOP design 908 by using the provided key to unlock the detailed design data from the side file 916 and using the provided decryption algorithm to decrypt the necessary details of the actual design data from the side file 916 during the pcell evaluation process for manufacturing the TOP design 908.

System Architecture Overview

Figure 10:
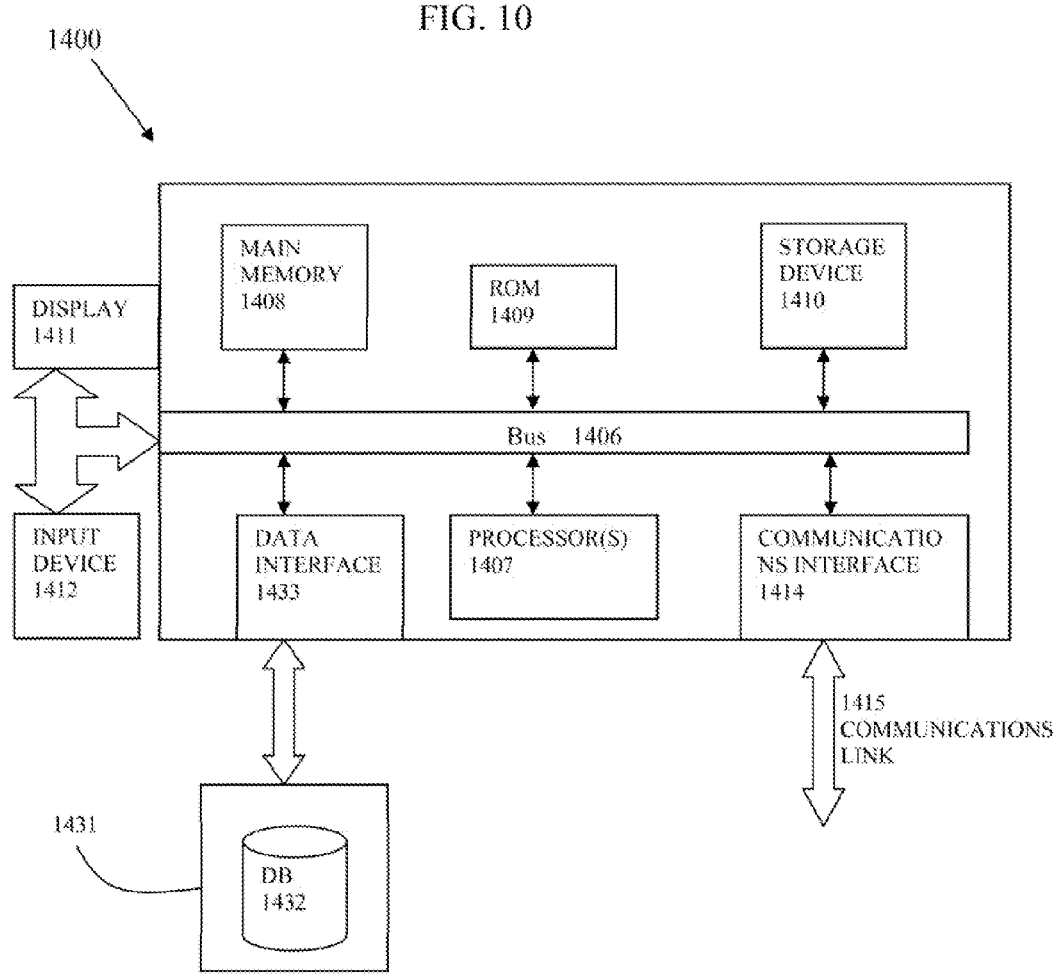
FIG. 10 illustrates a block diagram of an illustrative computing system 1400 suitable for implementing various embodiment of the invention.

FIG. 10 illustrates a block diagram of an illustrative computing system 1400 suitable for implementing various embodiment of the invention. For example, the exemplary computing system 1400 may be used to implement various processes as described in the preceding paragraphs and the figures such as various processes or modules of initiating IP encapsulation, creating pcell instances for various levels of encryption or access, moving design data for pcell instances into corresponding instances of design sub-masters, encrypting and decrypting design data, performing pcell instance evaluation, pushing down certain design data to a lower hierarchical level, etc. as described in the remainder of the Application. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processors or processor cores 1407 executing one or more sequences of one or more instructions contained in system memory 1408. Such instructions may be read into system memory 1408 from another computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that may be used to implement all or part of the invention. In the single embodiment or in some embodiments, the one or more processors or processor cores 1407 may be used to perform various actions such as various actions, processes, or modules involving determining, analyzing, performing actions, etc. In some embodiments, at least one of the one or more processors or processor cores 1407 has the multithreading capability.

In one embodiment, the term "logic" shall mean any combination of software or hardware that may be used to implement all or part of the invention. In the single embodiment or in some embodiments, the one or more processors or processor cores 1407 may be used to perform various acts such as various acts involving determining, analyzing, performing actions, etc. In some embodiments, at least one of the one or more processors or processor cores 1407 has the multithreading capability to execute a plurality of threads to perform various tasks as described in the preceding sections.

Various actions as described in the preceding paragraphs may be performed by using one or more processors, one or more processor cores, or combination thereof 1407. For example, various processes or modules involving the determining action, various analysis processes or modules, etc. may be performed by one or more processors, one or more processor cores, or combination thereof.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may comprise any tangible medium that can contain or store a program for use by or in connection with an instruction execution system, apparatus, or device. In some embodiments, a computer readable or usable storage medium may be referred to as a non-transitory computer readable or usable medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium, and that may communicate, propagate, or transport a program for use by or in connection with an instruction execution system, apparatus, or device. In some embodiments, a computer readable or usable signal medium may be referred to as a transitory computer readable or usable medium.

The term "computer readable storage medium" or "computer usable storage medium" as used herein refers to any non-transitory medium that participates in providing instructions to processor 1407 for execution in some embodiments. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer may read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention may be performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that may be readily accessible by the computer system 1400. The computer system 1400 communicates with the data storage system 1431 through a data interface 1433. A data interface 1433, which may be coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing dynamic protection of intellectual property in an electronic circuit design, comprising:
    using a computer system that comprises at least one processor or process core executing one or more threads to perform a process, the process comprising:
    initiating an encapsulation process for a block of electronic design;
    creating a first parameterized cell instance for the block of electronic design with a first level of encryption of or access to the block of electronic design, wherein the first parameterized cell includes some design data about the block but does not by itself contain or obtain design data that are needed to construct details of the first parameterized cell instance of the block within a boundary of the block of electronic design by a parameterized cell evaluation module in an electronic circuit design tool; and
    encrypting a first set of design data associated with the first level of encryption or access in a first sub-master for the first parameterized cell instance with the first level of encryption or access.

2. The computer implemented method of claim 1, further comprising:
    identifying or determining the design data that should be made available for the first level of encryption or access.

3. The computer implemented method of claim 1, wherein the action of creating the first parameterized cell instance and the act of encrypting the design data do not occur in a non-volatile computer accessible storage medium.

4. The computer implemented method of claim 1, further comprising:
    creating a second parameterized cell instance for a second level of encryption or access.

5. The computer implemented method of claim 4, further comprising:
    encrypting a second set of design data associated with the second level of encryption or access in a second sub-master for the second level of encryption or access.

6. The computer implemented method of claim 5, further comprising:
    storing the second set of design data that is encrypted in a side file in the non-volatile computer accessible storage medium.

7. The computer implemented method of claim 1, further comprising:
    providing a key to a user to unlock a side file, wherein the design data are decrypted from the side file using the key.

8. The computer implemented method of claim 7, further comprising:
    providing a side file and a decryption scheme to the user.

9. The computer implemented method of claim 1, wherein the first parameterized cell instance does not comprise design data that are used to rebuild a part of the electronic circuit design.

10. The computer implemented method of claim 1, further comprising:
    moving the design data into the first sub-master in a volatile computer accessible storage medium.

11. The computer implemented method of claim 9, wherein the first parameterized cell instance comprises a parameter for the first level of encryption or access and understands a scheme that is used for the act of encrypting the first set of design data.

12. An article of manufacture comprising a non-transitory computer accessible storage medium having a sequence of instructions which, when executed by at least one processor or processor core executing one or more threads, causes the at least one processor or processor core to perform a method for implementing dynamic protection of intellectual property in an electronic circuit design, comprising:
    a program code which, when executed by at the least one processor of a computer system, causes the at least one processor to perform one or more acts, the one or more acts comprising:
    initiating an encapsulation process for a block of electronic design;
    creating a first parameterized cell instance for the block of electronic design with a first level of encryption of or access to the block of electronic design, wherein
the first parameterized cell includes some design data
about the block but does not by itself contain or obtain
design data that are needed to construct details of the
first parameterized cell instance of the block within a
boundary of the block of electronic design by a
parameterized cell evaluation module in an electronic
circuit design tool; and
encrypting design data associated with the first level of
encryption or access in a sub-master for the first
parameterized cell instance with the first level of
encryption or access.

13. The article of manufacture of claim 12, further comprising:
the program code which, when executed by the at least one
processor, causes the at least one processor to perform an
act of creating a second parameterized cell instance for a
second level of encryption or access.

14. The article of manufacture of claim 13, further comprising:
the program code which, when executed by the at least one
processor, causes the at least one processor to perform an
act of encrypting a second set of design data associated
with the second level of encryption or access in a second
sub-master for the second level of encryption or access.

15. The article of manufacture of claim 14, the process
further comprising:
the program code which, when executed by the at least one
processor, causes the at least one processor to perform an
act of storing the second set of design data that is
encrypted in a side file in the non-volatile computer
accessible storage medium.

16. The article of manufacture of claim 12, wherein the first
parameterized cell instance does not comprise the enough
design data that are used to rebuild a part of the electronic
circuit design.

17. A system for implementing dynamic protection of
intellectual property in an electronic circuit design, comprising:
a computer system that comprises at least one processor or
processor core executing one or more threads and is at
least to:
initiate an encapsulation process for a block of electronic design;
create a first parameterized cell instance for the block of
electronic design with a first level of encryption of or
access to the block of electronic design, wherein the
first parameterized cell includes some design data
about the block but does not by itself contain or obtain
design data that are needed to construct details of the
first parameterized cell instance of the block within a
boundary of the block of electronic design by a
parameterized cell evaluation module in an electronic
circuit design tool; and
encrypt design data associated with the first level of
encryption or access in a sub-master for the first
parameterized cell instance with the first level of
encryption or access.

18. The system of claim 17, the computer system is further
to:
create a second parameterized cell instance for a second
level of encryption or access.

19. The system of claim 18, the computer system is further
to:
encrypt a second set of design data associated with the
second level of encryption or access in a second submaster for the second level of encryption or access.

20. The system of claim 19, the computer system is further
to:
store the second set of design data that is encrypted in a side
file in the non-volatile computer accessible storage
medium.

21. The system of claim 17, wherein the first parameterized
cell instance does not comprise design data that are used to
rebuild a part of the electronic circuit design.

22. A computer implemented method for using a dynamically protected intellectual property block design in an electronic circuit design, comprising:
using a computer system that comprises at least one processor or process core executing one or more threads and
is to perform a process, the process comprising:
identifying a side file for the dynamically protected intellectual property (IP) block design;
using a key to retrieve a sub-master of a plurality of submasters of the dynamically protected IP block design,
wherein the sub-master includes some design data about
the dynamically protected block but does not by itself
contain or obtain design data that are needed to construct
details of an instance of the dynamically protected IP
block within a boundary of the dynamically protected IP
block by a parameterized cell evaluation module in an
electronic circuit design tool; and
instantiating the instance of the dynamically protected IP
block design in the electronic circuit design by using an
instance of the sub-master.

23. The computer implemented method of claim 22, in
which the side file comprises the plurality of sub-masters of
the IP block design, each of which corresponds to an encryption or access level of a plurality of encryption or access
levels.

24. The computer implemented method of claim 22, in
which the instance of the one of the sub-masters is used to
protect actual data of the IP block design.

25. The computer implemented method of claim 24, in
which the instance of the one of the sub-masters does not
comprise the actual data other than boundary information of
the IP block design.

26. The computer implemented method of claim 22, further comprising:
preventing an access to another one of the plurality of
sub-masters of the IP block design with the key.

27. The computer implemented method of claim 22, in
which the act of using the key to retrieve one of the plurality
of sub-masters of the IP block design comprises:
identifying at least a portion of the side file, in which the
portion is associated with the key; and
performing a decryption process on the portion to retrieve
the one of the plurality of sub-masters of the IP block
design.

28. The computer implemented method of claim 22, further comprising:
identifying a reference from the side file to a second side
file, in which the second side file comprises a second
actual design data for a second IP block design;
using a second key to retrieve one of a second plurality of
sub-masters of the second IP block design; and
instantiating the second IP block design in the electronic
circuit design by using a second instance of the one of
the second plurality of sub-masters.

29. A system for using a dynamically protected intellectual
property block design in an electronic circuit design, comprising:
a computer system that comprises at least one processor or
process core executing one or more threads and is to:

identify a side file for the dynamically protected intellectual property (IP) block design;

use a key to retrieve a sub-master of a plurality of sub-masters of the dynamically protected IP block design, wherein the sub-master includes some design data about the dynamically protected block but does not by itself contain or obtain design data that are needed to construct details of an instance of the dynamically protected IP block within a boundary of the dynamically protected IP block by a parameterized cell evaluation module in an electronic circuit design tool; and initiate an instance the dynamically protected IP block design in the electronic circuit design by using an instance of the sub-master.

30. An article of manufacture comprising a non-transitory computer accessible storage medium having a sequence of instructions which, when executed by at least one processor or processor core executing one or more threads, causes the at least one processor or processor core to perform a method for using a dynamically protected intellectual property block design in an electronic circuit design, the method comprising:

a program code which, when executed by at least one processor or processor core executing one or more threads of a computer system, causes the at least one processor to perform one or more acts, the one or more acts comprising:

identifying a side file for the dynamically protected intellectual property (IP) block design;

using a key to retrieve a sub-master of a plurality of sub-masters of the dynamically protected IP block design, wherein the sub-master includes some design data about the dynamically protected block but does not by itself contain or obtain design data that are needed to construct details of an instance of the dynamically protected IP block within a boundary of the dynamically protected IP block by a parameterized cell evaluation module in an electronic circuit design tool; and instantiating an instance the dynamically protected IP block design in the electronic circuit design by using an instance of the sub-master.

31. The system of claim 29, in which the computer system is further to:

prevent an access to another one of the plurality of sub-masters of the IP block design with the key.

32. The system of claim 29, in which the computer system that is to use the key to retrieve one of the plurality of sub-masters of the IP block design is further to:

identify at least a portion of the side file, in which the portion is associated with the key; and perform a decryption process on the portion to retrieve the one of the plurality of sub-masters of the IP block design.

33. The system of claim 29, in which the computer system is further to identify a reference from the side file to a second side file, in which the second side file comprises a second actual design data for a second IP block design;

use a second key to retrieve one of a second plurality of sub-masters of the second IP block design; and instantiate the second IP block design in the electronic circuit design by using a second instance of the one of the second plurality of sub-masters.

34. The article of manufacture of claim 30, further comprising:

the program code which, when executed by the at least one processor or processor core, causes the at least one processor or processor core to perform an act of preventing an access to another one of the plurality of sub-masters of the IP block design with the key.

35. The article of manufacture of claim 30, in which the program code which, when executed by the at least one processor or processor core, causes the at least one processor or processor core to perform the one or more acts comprising using the key to retrieve one of the plurality of sub-masters of the IP block design further comprises:

a segment of the program code which, when executed, causes the at least one processor or processor core to perform an act of identifying at least a portion of the side file, in which the portion is associated with the key; and the segment of the program code which, when executed, causes the at least one processor or processor core to perform an act of performing a decryption process on the portion to retrieve the one of the plurality of sub-masters of the IP block design.

36. The article of manufacture of claim 30, further comprising:

the program code which, when executed, causes the at least one processor or processor core to perform an act of identifying a reference from the side file to a second side file, in which the second side file comprises a second actual design data for a second IP block design;

the program code which, when executed, causes the at least one processor or processor core to perform an act of using a second key to retrieve one of a second plurality of sub-masters of the second IP block design; and the program code which, when executed, causes the at least one processor or processor core to perform an act of instantiating the second IP block design in the electronic circuit design by using a second instance of the one of the second plurality of sub-masters.

* * * * *